(No Model.)
J. G. MOOMY.
COMBINED MOP HEAD AND WRINGER.
No. 262,303. Patented Aug. 8, 1882.
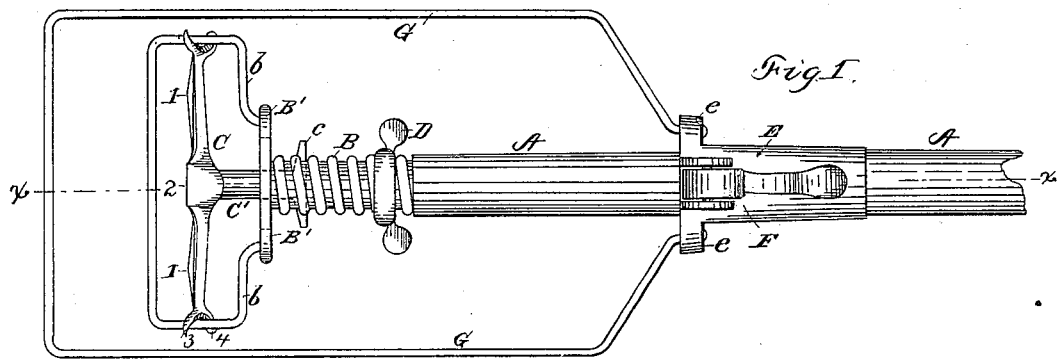
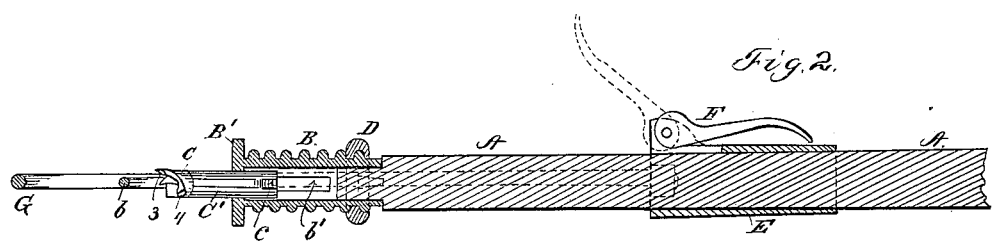
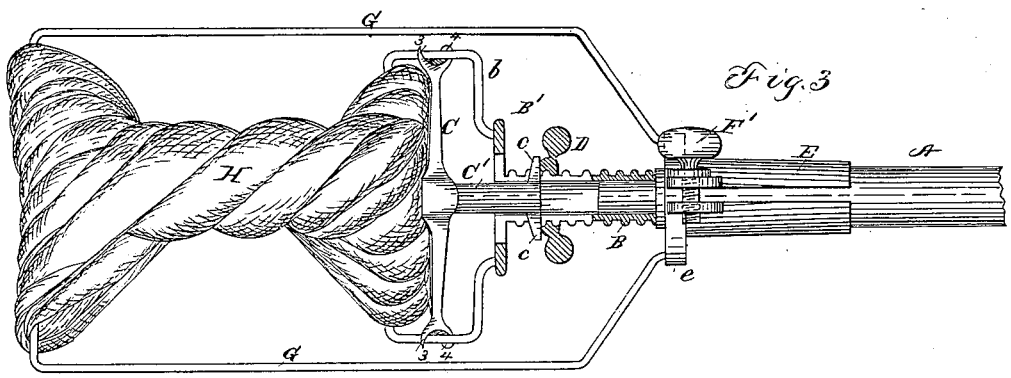
Witnesses
W. R. Edelen
Robt. H. Porter
Inventor
J. G. Moomy
Per Hallock & Hallock
Att's

UNITED STATES PATENT OFFICE.

JOSEPH G. MOOMY, OF ERIE, PENNSYLVANIA.

COMBINED MOP HEAD AND WRINGER.

SPECIFICATION forming part of Letters Patent No. 262,303, dated August 8, 1882.

Application filed March 21, 1882. (No model.)

*To all whom it may concern:*

Be it known that I, JOSEPH G. MOOMY, a citizen of the United States, residing at Erie, in the county of Erie and State of Pennsylvania, have invented new and useful Improvements in Mop Heads and Wringers; and I do hereby declare that the following is a full, clear, and exact description thereof, reference being had to the accompanying drawings and the letters or figures of reference marked thereon.

This invention relates to the construction of mop heads and wringing attachments. The nature and scope of my invention will appear in the following general description and the subjoined claims.

My device is illustrated in the accompanying drawings as follows:

Figure 1 is an elevation-view of the mop head and wringing attachment. Fig. 2 is a section on the line $x\ x$ in Fig. 1. Fig. 3 is a similar view to Fig. 1, only the cloth is shown in the mop as it appears when being wrung, and parts of the mop-head are shown in section.

The letters of reference indicate parts as follows:

A is the mop-handle.

B is the socket or shank of the head, which is screw-threaded.

B' is the T or cross head on the end of the shank.

$b$ is the wire which forms part of the clamp.

C is the jaw or movable part of the clamp.

C' is the stem or shank of the part C.

$c$ is the inner head of the shank C'.

D is the nut which moves the jaw C.

G is the bail of the wringer.

E is the ferrule which holds the bail to the handle.

F is a cam-latch for holding the ferrule at any point on the handle.

F' is another form of clamp for the same purpose.

H is the cloth or material of which the mop is formed.

The construction and operation are as follows:

The shank B of the head is provided with a socket to receive the handle, and also the shank C' of the movable jaw C, and has slots $b'$ on its sides to receive the inner cross-head, $c$, of said shank C', which cross-head $c$ serves as a bearing for the hand-nut D. The shank B is also provided on its surface with screw-threads for the said nut D. At the outer end of the shank B is a head, B', to which is attached the wire bail $b$, which forms the stationary jaw of the clamp. The movable jaw C has at each end prongs 3 and 4, which form guides for it to slide upon the wire $b$. The clamping-face of the jaw C, in place of having a groove in it, has three faces, 1, 1, and 2, of which 1 and 1 slant in one direction and 2 in the other, thus forming in effect a groove with alternate parts removed. The object of this is chiefly to make the pattern from which the molds in which it is cast are made to draw properly from the sand; and, secondly, it holds the material of the mop more firmly than a plain groove.

The wringing attachment is as follows: The ferrule E moves freely and easily on the handle, and the bail G, being attached thereto, can be dawn up close to the mop-head, as shown in Figs. 1 and 2; or it can be shoved out, as shown in Fig. 3. The bail is attached to the opposite end of the material from that held by the head. By turning the handle the mop-head can revolve within the bail and twist the mop H, as shown in Fig. 3, and wring it. The ferrule E is provided with means for clamping it to the handle. In Figs. 1 and 2 the clamp consists of a cam-latch, F. In Fig. 3 it is formed by having the ferrule E split on one side and provided with lugs in which operates a screw, F', for drawing it together, so as to clamp it upon the handle. This latter is the best construction, as it can be clamped to the handle without marring it, and also because the ferrule can be adapted to handles of various sizes more readily. The object of the clamp is to hold the wringer up against the head when the mop is being used.

The wringing attachment can be taken off the mop and put on at pleasure by slipping the ferrule off and on the handle, and consequently it can be used on one mop or another, as desired. Therefore it may constitute a separate article of manufacture for application upon various styles of mops. When thus made for sale separately the style of clamp shown in Fig. 3, or one similar having a ferrule which can be expanded and contracted, will be advantageous, as it will admit and adapt itself to handles varying in size.

I am aware that a wringing device has been made which operates like the one shown to wring the mop; but it could not be taken off one mop-handle and put on another at pleasure; nor had it any means for clamping it to the handle, but had to be held back by the hand or left to slide up and down the handle during the work of mopping.

What I claim as new is—

1. A mop-holder consisting of a head having a hollow slotted shank and a slotted collar, a clamping-jaw fixed to the slotted collar, and a nut working upon the screw-threads upon the outer side of the shank, and unattached to any other part, and of a movable jaw having a T-shaped shank fitting within and working in the slot in the hollow shank, and adapted to be moved by the nut upon the hollow shank.

2. The combination, with the mop head and handle of a mop, of the frame G and ferrule E, open on one side and provided with lugs, in which operates a clamping-screw, F', substantially as and for the purposes mentioned.

3. As a new article of manufacture, a wringer attachment for mops, consisting of a frame, G, and ferrule E, having thereon a clamping device for holding the said device at various points upon the handle, as set forth.

In testimony that I claim the foregoing I have hereunto set my hand this 1st day of March, 1882.

JOS. G. MOOMY.

Witnesses:
J. K. HALLOCK,
ROBT. PORTER.